(12) United States Patent
Robbins

(10) Patent No.: US 8,908,835 B1
(45) Date of Patent: Dec. 9, 2014

(54) METHOD AND SYSTEM FOR PROVIDING FORCED HOLD BEHAVIOR IN A SIP-BASED NETWORK

(75) Inventor: David C. Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1757 days.

(21) Appl. No.: 11/534,399

(22) Filed: Sep. 22, 2006

Related U.S. Application Data

(60) Provisional application No. 60/719,465, filed on Sep. 22, 2005.

(51) Int. Cl.
*H04M 11/04* (2006.01)

(52) U.S. Cl.
CPC .................. *H04M 11/04* (2013.01)
USPC ............ 379/45; 379/37; 379/49; 379/50

(58) Field of Classification Search
USPC ......... 379/45, 38, 46, 49, 50, 211.01, 212.01, 379/251, 308, 353; 370/352–355; 455/404.1, 414.1; 340/503
See application file for complete search history.

(56) References Cited

U.S. PATENT DOCUMENTS

| | | | |
|---|---|---|---|
| 3,737,587 A | 6/1973 | Romero | |
| 4,154,987 A | 5/1979 | Rosenberg et al. | |
| 4,528,424 A | 7/1985 | Middleton et al. | |
| 4,723,271 A | 2/1988 | Grundtisch | |
| 4,741,024 A | 4/1988 | Del Monte et al. | |
| 4,950,011 A | 8/1990 | Borcea et al. | |
| 5,165,095 A | 11/1992 | Borcherding | |
| 5,323,444 A * | 6/1994 | Ertz et al. .................. | 379/45 |
| 5,471,519 A | 11/1995 | Howe et al. | |
| 5,475,745 A * | 12/1995 | Boyle ............... | 379/45 |
| 5,619,561 A | 4/1997 | Reese | |
| 5,815,550 A * | 9/1998 | Miller ................ | 379/37 |
| 5,835,570 A | 11/1998 | Wattenbarger | |
| 5,913,166 A | 6/1999 | Buttitta et al. | |
| 5,970,134 A | 10/1999 | Highland et al. | |
| 5,999,610 A | 12/1999 | Lin et al. | |
| 6,021,176 A | 2/2000 | McKendry et al. | |
| 6,026,156 A | 2/2000 | Epler et al. | |
| 6,031,896 A | 2/2000 | Gardell et al. | |
| 6,072,865 A | 6/2000 | Haber | |
| 6,208,726 B1 | 3/2001 | Bansal et al. | |
| 6,219,414 B1 | 4/2001 | Maciejewski et al. | |
| 6,308,726 B2 | 10/2001 | Sato et al. | |
| 6,337,898 B1 | 1/2002 | Gordon | |
| 6,339,639 B1 | 1/2002 | Henderson | |
| 6,404,876 B1 | 6/2002 | Smith et al. | |
| 6,484,196 B1 | 11/2002 | Maurille | |
| 6,510,315 B1 * | 1/2003 | Arnson ............... | 455/404.1 |

(Continued)

OTHER PUBLICATIONS www.carrollcommunications.com/ipoffice/5donotdisturb.html, p. 1 of 2.

(Continued)

*Primary Examiner* — Melur Ramakrishnaiah

(57) ABSTRACT

A method and system and process for providing forced hold behavior is disclosed. The forced hold behavior may be enabled during an emergency dialog between a user and a Public Safety Answering Point, or PSAP, if a user has abandoned or attempted to end the emergency call. This behavior informs the PSAP that the user has abandoned the call, and permits the PSAP to reestablish communication with the user.

20 Claims, 9 Drawing Sheets

(56) References Cited

U.S. PATENT DOCUMENTS

| | | |
|---|---|---|
| 6,636,594 B1 | 10/2003 | Oran |
| 6,735,295 B1 | 5/2004 | Brennan et al. |
| 6,741,695 B1 | 5/2004 | McConnell et al. |
| 6,744,877 B1 | 6/2004 | Edwards |
| 6,754,325 B1 | 6/2004 | Silver et al. |
| 6,801,604 B2 | 10/2004 | Maes et al. |
| 6,807,259 B1 | 10/2004 | Patel et al. |
| 6,826,174 B1 | 11/2004 | Erekson et al. |
| 6,834,048 B1 | 12/2004 | Cho et al. |
| 6,856,616 B1 | 2/2005 | Schuster et al. |
| 6,857,072 B1 | 2/2005 | Schuster et al. |
| 6,870,830 B1 | 3/2005 | Schuster et al. |
| 6,876,632 B1 | 4/2005 | Takeda |
| 6,879,673 B2 | 4/2005 | Creamer et al. |
| 6,954,521 B2 | 10/2005 | Bull et al. |
| 6,954,524 B2 | 10/2005 | Gibson |
| 6,961,332 B1 | 11/2005 | Li et al. |
| 6,963,633 B1 | 11/2005 | Diede et al. |
| 6,965,614 B1 | 11/2005 | Osterhout et al. |
| 6,985,961 B1 | 1/2006 | Ramsayer et al. |
| 6,996,605 B2 | 2/2006 | Low et al. |
| 7,020,130 B2 | 3/2006 | Krause et al. |
| 7,031,700 B1 | 4/2006 | Weaver et al. |
| 7,039,710 B2 | 5/2006 | Khartabil |
| 7,050,559 B2 | 5/2006 | Silver et al. |
| 7,082,193 B2 | 7/2006 | Barclay et al. |
| 7,085,253 B2 | 8/2006 | Yang |
| 7,130,282 B2 | 10/2006 | Black |
| 7,145,997 B2 * | 12/2006 | Poikselka et al. ........ 379/210.01 |
| 7,203,293 B1 | 4/2007 | Bedingfield |
| 7,224,792 B2 | 5/2007 | Fusco |
| 7,257,837 B2 | 8/2007 | Xu et al. |
| 7,260,201 B2 | 8/2007 | Jorasch et al. |
| 7,274,662 B1 | 9/2007 | Kalmane et al. |
| 7,283,517 B2 | 10/2007 | Yan et al. |
| 7,290,288 B2 | 10/2007 | Gregg et al. |
| 7,295,577 B2 | 11/2007 | Moody et al. |
| 7,301,913 B2 | 11/2007 | Corrao et al. |
| 7,406,696 B2 | 7/2008 | Burger et al. |
| 7,426,265 B2 | 9/2008 | Chen et al. |
| 7,440,440 B1 | 10/2008 | Abichandani et al. |
| 7,460,657 B1 | 12/2008 | Baeza |
| 7,489,771 B2 | 2/2009 | McMurry et al. |
| 7,564,846 B2 | 7/2009 | Dezonno et al. |
| 7,580,497 B2 | 8/2009 | Wang et al. |
| 7,587,031 B1 * | 9/2009 | Ress et al. ........................ 379/45 |
| 7,593,389 B2 | 9/2009 | Vance |
| 7,599,355 B2 | 10/2009 | Sunstrum |
| 7,602,901 B1 | 10/2009 | Kates et al. |
| 7,609,700 B1 | 10/2009 | Ying et al. |
| 7,609,706 B2 | 10/2009 | Scott et al. |
| 7,630,481 B2 | 12/2009 | Kafka |
| 7,715,413 B2 | 5/2010 | Vaziri et al. |
| 7,743,141 B2 | 6/2010 | Wang et al. |
| 7,773,581 B2 | 8/2010 | Punj et al. |
| 7,813,490 B2 | 10/2010 | DeMent et al. |
| 7,849,205 B2 | 12/2010 | Pounds et al. |
| 7,860,089 B2 | 12/2010 | Tripathi et al. |
| 8,036,360 B1 | 10/2011 | Gogineni et al. |
| 8,059,805 B2 | 11/2011 | Claudatos et al. |
| 8,116,302 B1 | 2/2012 | Robbins |
| 8,379,824 B2 | 2/2013 | Jackson et al. |
| 2002/0038388 A1 | 3/2002 | Netter |
| 2002/0114318 A1 | 8/2002 | Rines |
| 2002/0131447 A1 | 9/2002 | Krishnamurthy et al. |
| 2002/0136359 A1 | 9/2002 | Stumer et al. |
| 2002/0136363 A1 * | 9/2002 | Stumer et al. .................... 379/45 |
| 2002/0137495 A1 | 9/2002 | Gabrysch |
| 2002/0141548 A1 | 10/2002 | Boda |
| 2002/0156900 A1 | 10/2002 | Marquette et al. |
| 2003/0007483 A1 | 1/2003 | Um |
| 2003/0028806 A1 | 2/2003 | Govindarajan et al. |
| 2003/0043992 A1 | 3/2003 | Wengrovitz |
| 2003/0088421 A1 | 5/2003 | Maes et al. |
| 2003/0231759 A1 | 12/2003 | Bedingfield, Sr. et al. |
| 2004/0030750 A1 | 2/2004 | Moore et al. |
| 2004/0037403 A1 | 2/2004 | Koch |
| 2004/0051900 A1 * | 3/2004 | Sagiya et al. ................ 358/1.15 |
| 2004/0082324 A1 | 4/2004 | Ayoub |
| 2004/0090954 A1 | 5/2004 | Zhang et al. |
| 2004/0148395 A1 | 7/2004 | Schulzrinne |
| 2004/0174983 A1 | 9/2004 | Olschwang et al. |
| 2004/0207724 A1 | 10/2004 | Crouch et al. |
| 2004/0240656 A1 | 12/2004 | Poustchi |
| 2004/0243680 A1 | 12/2004 | Mayer |
| 2004/0249951 A1 | 12/2004 | Grabelsky et al. |
| 2004/0264406 A1 | 12/2004 | Pattenden et al. |
| 2005/0013421 A1 | 1/2005 | Chavez et al. |
| 2005/0043014 A1 | 2/2005 | Hodge |
| 2005/0069104 A1 | 3/2005 | Hanson et al. |
| 2005/0078642 A1 | 4/2005 | Mayer et al. |
| 2005/0123104 A1 | 6/2005 | Bishop et al. |
| 2005/0129219 A1 | 6/2005 | Williamson |
| 2005/0147227 A1 | 7/2005 | Chervirala et al. |
| 2005/0190721 A1 | 9/2005 | Pershan |
| 2005/0193338 A1 | 9/2005 | Hawkins et al. |
| 2005/0195802 A1 | 9/2005 | Klein et al. |
| 2005/0201530 A1 | 9/2005 | Koch et al. |
| 2005/0213716 A1 * | 9/2005 | Zhu et al. ........................ 379/45 |
| 2005/0215243 A1 | 9/2005 | Black et al. |
| 2005/0226217 A1 | 10/2005 | Logemann et al. |
| 2005/0237978 A1 | 10/2005 | Segal |
| 2005/0249196 A1 | 11/2005 | Ansari et al. |
| 2005/0286466 A1 | 12/2005 | Tagg et al. |
| 2006/0023658 A1 | 2/2006 | Phillips et al. |
| 2006/0033809 A1 | 2/2006 | Farley |
| 2006/0039389 A1 | 2/2006 | Burger et al. |
| 2006/0050648 A1 | 3/2006 | Eydelman |
| 2006/0050682 A1 | 3/2006 | Vance |
| 2006/0062210 A1 | 3/2006 | Dharanikota |
| 2006/0062251 A1 | 3/2006 | Lim et al. |
| 2006/0067300 A1 | 3/2006 | Poustchi et al. |
| 2006/0067504 A1 * | 3/2006 | Goldman et al. ........ 379/221.08 |
| 2006/0140379 A1 | 6/2006 | Yamamoto et al. |
| 2006/0140380 A1 | 6/2006 | Croak et al. |
| 2006/0146737 A1 | 7/2006 | Sandgren et al. |
| 2006/0153342 A1 * | 7/2006 | Sasaki ............................ 379/37 |
| 2006/0165060 A1 | 7/2006 | Dua |
| 2006/0177030 A1 | 8/2006 | Rajagopalan et al. |
| 2006/0177044 A1 | 8/2006 | O'Neil et al. |
| 2006/0178130 A1 | 8/2006 | Makrygiannis |
| 2006/0203986 A1 | 9/2006 | Gibson |
| 2006/0218283 A1 | 9/2006 | Jones et al. |
| 2006/0221176 A1 | 10/2006 | Di Pietro et al. |
| 2006/0251229 A1 | 11/2006 | Gorti et al. |
| 2006/0285533 A1 | 12/2006 | Divine et al. |
| 2006/0286984 A1 | 12/2006 | Bonner |
| 2007/0025270 A1 | 2/2007 | Sylvain |
| 2007/0058613 A1 | 3/2007 | Beckemeyer |
| 2007/0083658 A1 | 4/2007 | Hanna et al. |
| 2007/0092073 A1 | 4/2007 | Olshansky et al. |
| 2007/0111723 A1 | 5/2007 | Ahmed et al. |
| 2007/0143858 A1 | 6/2007 | Hearty |
| 2007/0147601 A1 | 6/2007 | Tischer et al. |
| 2007/0280469 A1 | 12/2007 | Baker et al. |
| 2008/0049724 A1 | 2/2008 | Tsujino et al. |
| 2008/0126549 A1 | 5/2008 | Khanchandani et al. |

OTHER PUBLICATIONS www.cisco.com/en/U/s/products/sw/voicesw/ps556/products_administration_guide, pp. 3-5 of 26.

Rosenberg et al. "RFC 3261, SIP: Session Initiation Protocol", The Internet Society, Jun. 2002.

Newton's Telecom Dictionary 22nd Edition, p. 829, Feb. 2006.

Sparks, "RFC 3515—The Session Initiation Protocol (SIP) Refer Method," The Internet Society, Apr. 2003.

Mahy et al., "RFC 3891—The Session Initiation Protocol (SIP) 'Replaces' Header," The Internet Society, Sep. 2004.

Mahy et al, "RFC 3911—The Session Initiation Protocol (SIP) 'Join' Header," The Internet Society, Oct. 2004.

Handley et al., "RFC 2327—SDP: Session Description Protocol," The Internet Society, Apr. 1998.

(56) References Cited

OTHER PUBLICATIONS

Schulzrinne et al., "RFC 1889—RTP: A Transport Protocol for Real-Time Applications," The Internet Society, Jan. 1996.

Schulzrinne et al., "RFC 2833—RTP Payload for DTMF Digits, Telephony Tones and Telephony Signals," The Internet Society, May 2000.

Mahy et al., "Draft-ietf-sip-join-03—The Session Initiation Protocol (SIP) "Join" Header," The Internet Society, Feb. 2004.

Mahy et al., "Draft-ietf-sipping-cc-framework-03—A Call Control and Multi-party usage framework for the Session Initiation Protocol (SIP)," The Internet Society, Oct. 27, 2003.

Rosenberg, "RFC 3311—The Session Initiation Protocol (SIP) Update Method," The Internet Society, Sep. 2002.

Rosenberg et al., "RFC 3262—Reliability of Provisional Responses in the Session Initiation Protocol (SIP)," The Internet Society, Jun. 2002.

Jennings et al., "RFC 3325—Private Extensions to the Session Initiation Protocol (SIP) for Asserted Identity within Trusted Networks," The Internet Society, Nov. 2002.

Harrington et al., "RFC 3411—An Architecture for Describing Simple Network Management Protocol (SNMP) Management Frameworks," The Internet Society, Dec. 2002.

Rosenberg et al., "RFC 3840—Indicating User Agent Capabilities in the Session Initiation Protocol (SIP)," The Internet Society, Aug. 2004.

Mahy, "RFC 3842—A Message Summary and Message Waiting Indication Event Package for the Session Initiation Protocol (SIP)," The Internet Society, Aug. 2004.

"SR-504: SPCS Capabilities and Features," Telcordia Technologies, Issue 1, Mar. 1996.

"SR-3065: LSSGR Guide," Telcordia Technologies, Issue 7, Aug. 2003.

Mahy et al., "draft-ietf-sip-replaces-05—The Session Initiation Protocol (SIP) "Replaces" Header," The Internet Society, Feb. 16, 2004.

Schulzrinne, "draft-ietf-sipping-sos-00—Emergency Services URI for the Session Initiation Protocol," The Internet Society, Feb. 8, 2004.

Rosenberg et al., "draft-ietf-sipping-dialog-package-04—An INVITE Initiated Dialog Event Package for the Session Initiation Protocol (SIP)," The Internet Society, Feb. 13, 2004.

Lingle et al., "draft-ietf-sip-mib-08—Management Information Base for Session Initiation Protocol (SIP)," The Internet Society, Jul. 16, 2004.

Johnston et al., "draft-ietf-sipping-cc-conferencing-04—Session Initiation Protocol Call Control—Conferencing for User Agents," The Internet Society, Jul. 18, 2004.

Sparks et al., "draft-ietf-sipping-cc-transfer-02—Session Initiation Protocol Call Control—Transfer," The Internet Society, Feb. 15, 2004.

Rosenberg et al., "draft-ietf-sipping-conference-package-04—A Session Initiation Protocol (SIP) Event Package for Conference State," The Internet Society, May 21, 2004.

Petrie, "draft-ietf-sipping-config-framework-04—A Framework for Session Initiation Protocol User Agent Profile Delivery," The Internet Society.

"GR-1298-CORE-AINGR: Switching Systems," Telcordia Technologies, Issue 6, Nov. 2000.

"Cisco CallManager Features and Services Guide, Release 4.1(3)—Multilevel Precedence and Preemption," Cisco Systems, Inc., http://www.cisco.com/en/US/products/sw/voicesw/ps556/products_administration_guide . . . , three pages, Copyright 2005.

"IP Office, Do Not Disturb," Carroll Communications, Inc., www.carrollcommunications.com/ipoffice/5donotdisturb.html, one page, Copyright 2008.

Petrie, "A Framework for Session Initiation Protocol User Agent Profile Delivery, draft-ietf-sipping-config-framework-04.txt," Pingtel Corp., SIPPING Working Group, The Internet Society, 34 pages, Jul. 19, 2004.

\* cited by examiner

METHOD AND SYSTEM FOR PROVIDING FORCED HOLD BEHAVIOR IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides a "forced hold" behavior. The forced hold behavior may be enabled during an emergency dialog between a user and a Public Safety Answering Point, or PSAP, if a user has abandoned or attempted to end the emergency call. This behavior informs the PSAP that the user has abandoned the call, and permits the PSAP to reestablish communication with the user.

Figure 1:
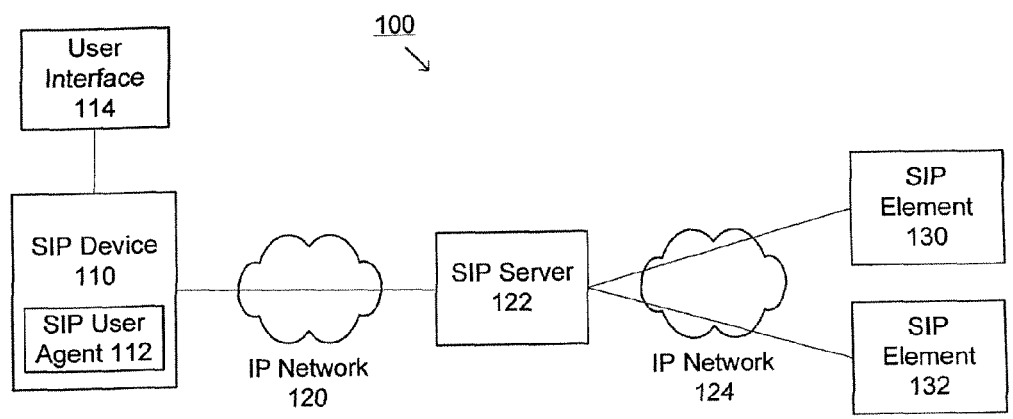
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular, a forced hold behavior. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voiceband or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent. In the figures, a PSAP is represented by SIP Element 130 or 132.

According to the present invention, SIP User Agent 112 is configured to enable or disable a "forced hold" behavior. As discussed above, the forced hold behavior may be enabled during an emergency dialog between a user and a PSAP, if a user has abandoned or attempted to end the emergency call. This behavior informs the PSAP that the user has abandoned the call, and permits the PSAP to reestablish communication with the user.

Figure 2:
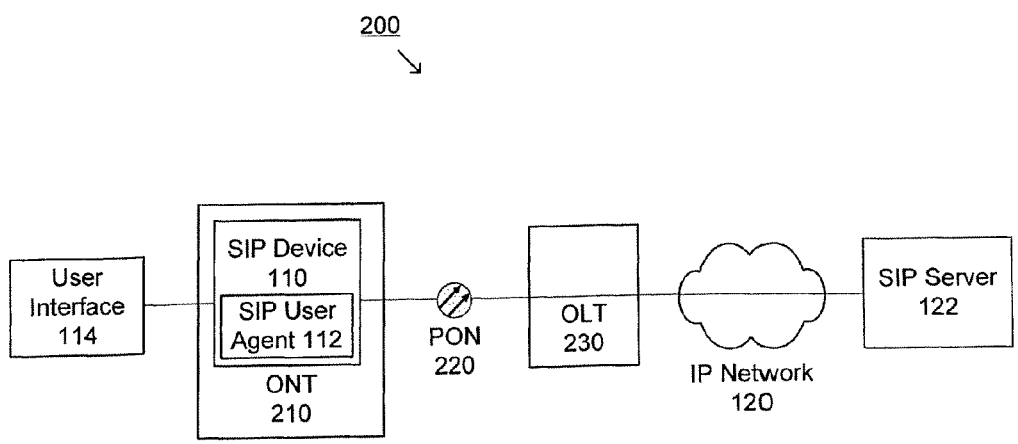
FIG. 2 illustrates an exemplary implementation where a SIP Device is embedded in a FTTP network, according to an embodiment of the present invention.
Figure 3:
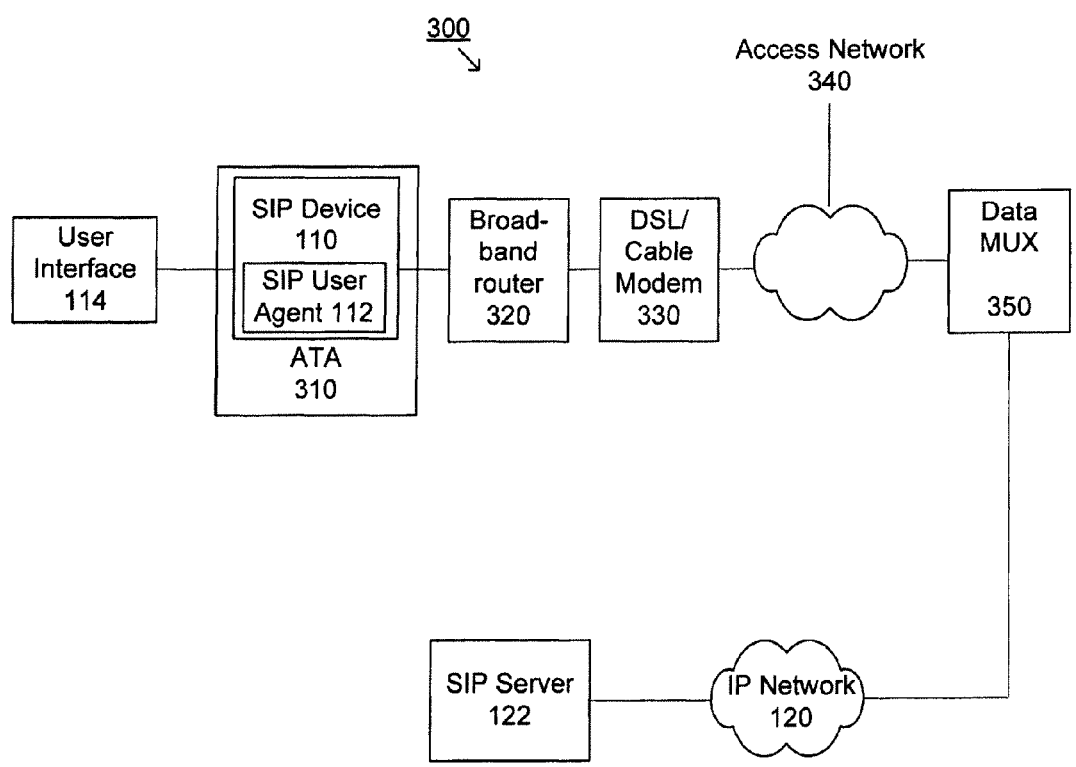
FIG. 3 illustrates an exemplary implementation where a SIP Device is embedded in an ATA device connected to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 with a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

One important calling feature that is implemented in any calling system is emergency calling. Emergency calling allows a user to quickly contact a PSAP that can coordinate an emergency response, such as contacting law enforcement, requesting medical assistance, etc. During an emergency call, certain calling features, such as call waiting, are disabled, and the user is prevented from taking an action that would disconnect the emergency dialog with the PSAP.

One feature of an emergency calling service is "forced hold," which informs the PSAP if the user has abandoned, or attempted to end, the call. It also permits the PSAP to attempt to reestablish communication with the user.

Figure 4:
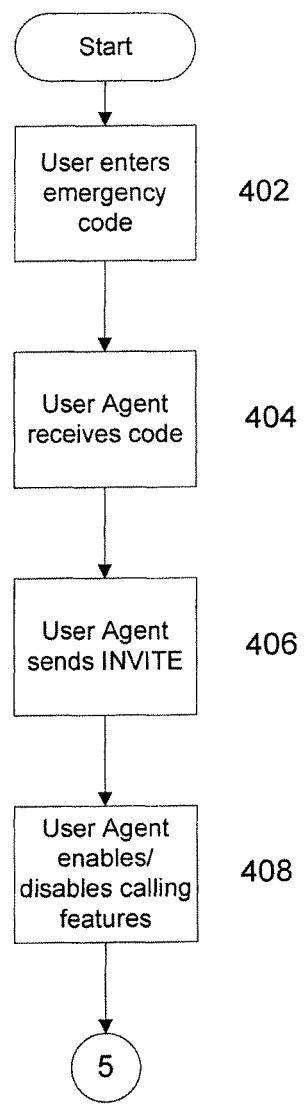
FIG. 4 is a flowchart depicting a portion of a method of providing a forced hold behavior according to an embodiment of the present invention.
Figure 5:
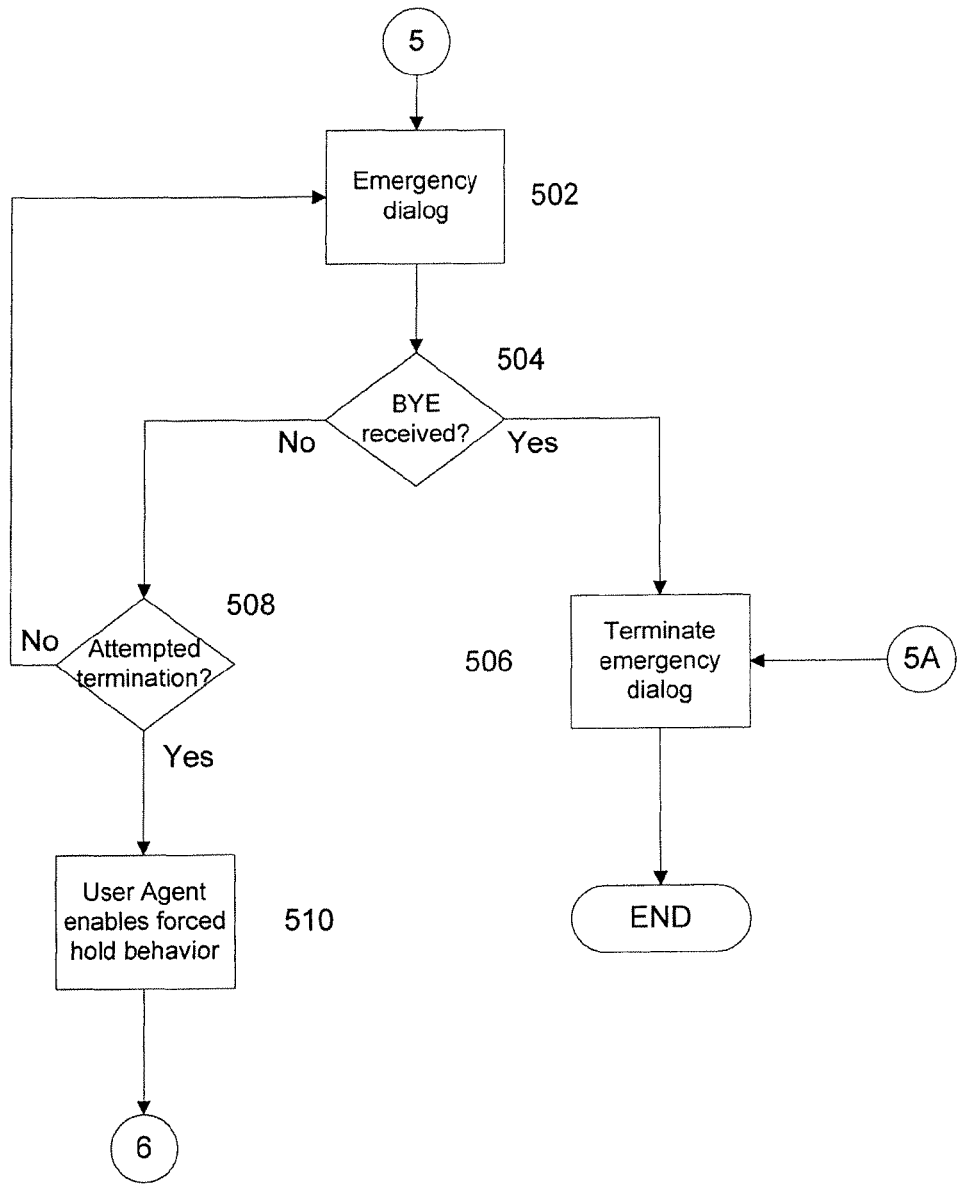
FIG. 5 is a flowchart depicting a further portion of a method of providing a forced hold behavior according to an embodiment of the present invention.
Figure 6:
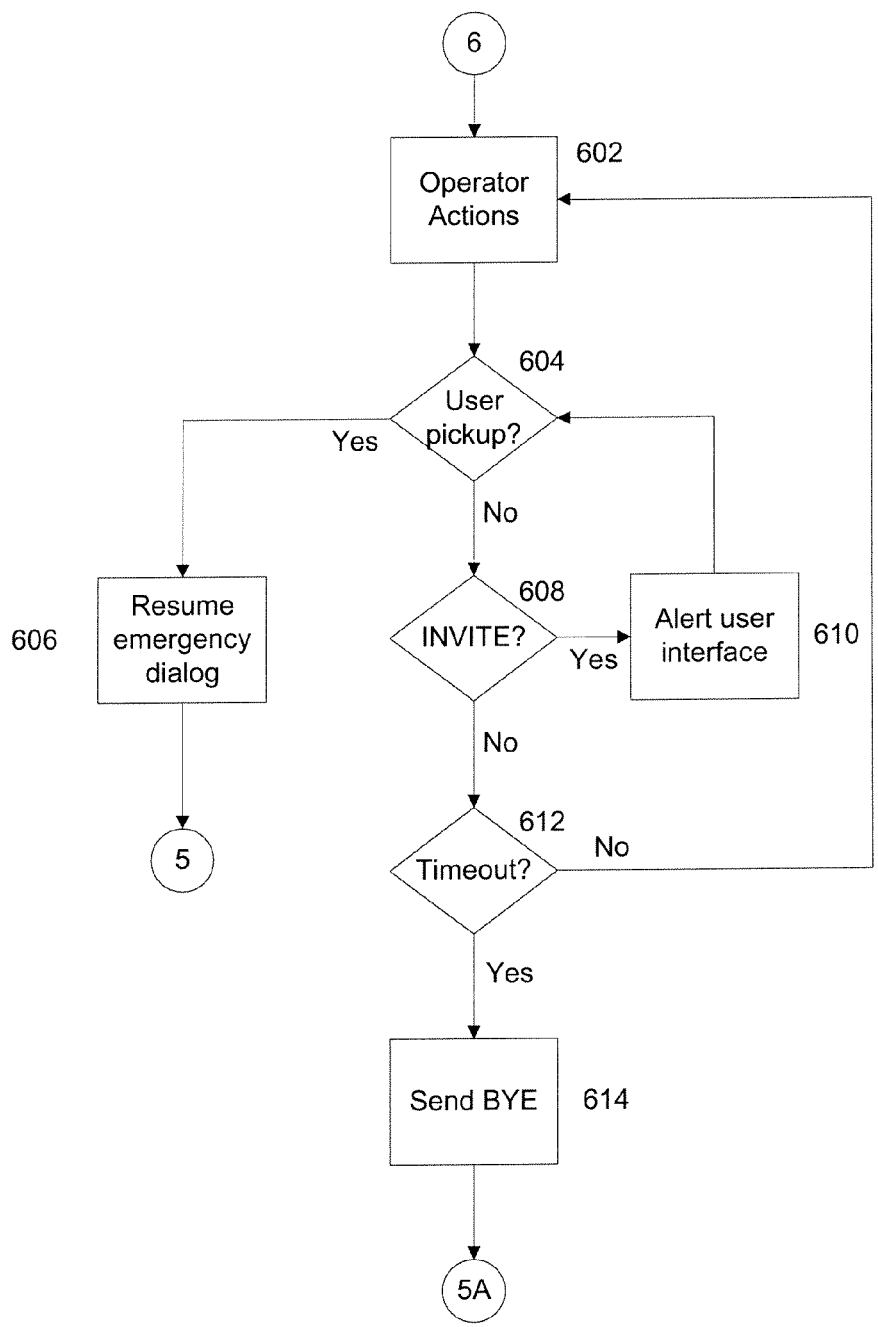
FIG. 6 is a flowchart depicting yet another further portion of a method of providing a forced hold behavior according to an embodiment of the present invention.

Referring to FIGS. 4-6, a flowchart depicting a method of providing a forced hold behavior in the context of a SIP-enabled network, according to an embodiment of the present invention, is provided. FIG. 4 illustrates the general steps of establishing an emergency dialog between a user (via a User Interface) and a PSAP.

First, in step 402, to initiate an emergency call, the user enters a predetermined emergency code (e.g., 9-1-1; 1-9-1-1; 0-9-1-1; and 1-0-1-X-X-X-X-9-1-1) into its User Interface. In step 404, the SIP User Agent receives the digits and recognizes the digits as indicating an emergency call.

In step 406, the SIP User Agent sends an INVITE request to the SIP server to open an emergency dialog. In one embodiment, the INVITE request may include a priority header field, and the priority header field may have a value indicating an emergency call, such as "emergency." In another embodiment, the INVITE request may also have a resource-priority header field that may have a value indicating an emergency call, such as "emerg.0." The inclusion of the priority header field and/or the resource priority header field are optional.

In step 408, the SIP User Agent enables or disables certain calling features or behaviors in order to satisfy the requirement that the user is not permitted to invoke any feature that would disrupt the communication with the PSAP. This is described in GR-529, the contents of which are expressly incorporated by reference in its entirety. In one embodiment, this may include disabling call waiting, ignoring any User Interface action that would place the emergency call on hold, and/or allowing certain three-way calling connections. Specifically, with regard to call waiting, when this feature is disabled, any incoming INVITE that is not associated with an existing dialog (e.g., an incoming call from a third party) will receive a 486 response. With regard to three-way calling, if the emergency call was initiated using the procedure for initiating a three-way call or call transfer, the action that joins the first call with the emergency dialog in a conference may be permitted. Other three-way calling features may be disabled.

Referring to FIG. 5, in step 502, an emergency dialog between the user and the PSAP is established. This emergency dialog is maintained until in step 504, a "BYE" is received from the PSAP. The emergency dialog is terminated in step 506.

In step 508, during the emergency dialog, the user may attempt to end the emergency dialog by, for example, hanging up (i.e., going on-hook) or pressing a button, such as an "end" button. For simplicity, the term "on hook" will encompass these activities. If the user attempts to do this, in step 510, the SIP User Agent enables a "forced hold" behavior. When the forced hold behavior is enabled, any user interface action that would normally end the call will not end the emergency dialog. Instead, the SIP User Agent will place the media session on hold. This feature allows the SIP server to maintain the connection to the PSAP and signal the PSAP that the user has abandoned, or attempted to end, the call. It also permits the PSAP to attempt to reestablish communication with the user.

In one embodiment, if the SIP server PSAP does not support the forced hold, the SIP Server may respond to the media session being placed on hold by sending a BYE to end the dialog. This is a specialized behavior on the part of the SIP Server. If the SIP User Agent is used with an application server that does not implement this specialized behavior, the forced hold behavior would result in the user being unable to end an emergency call. It may therefore be appropriate to enable the forced hold behavior only when it is known that the application server supports the behavior. This may be discovered as part of a registration and/or configuration process with the SIP Server.

Referring to FIG. 6, the PSAP operator may take an action to alert the user interface of the attempted termination of the emergency dialog. In one embodiment, if the line is on-hook, the PSAP operator may initiate a "ringback" to cause the user interface to ring. In another embodiment, if the line is on-hook, the PSAP operator may initiate distinctive power ringing. In yet another embodiment, if the line is off-hook, a burst of "howler" or "high tone" may be applied.

When the forced hold behavior is enabled, the SIP User Agent may respond to User Interface actions as follows. If, in step 604, the user goes off-hook, in step 606, the SIP User Agent will instead resume the held emergency dialog.

If, in step 608, the SIP User Agent receives an INVITE within the emergency dialog, in step 610, the User Interface will be alerted as for a normal INVITE. This may include any alert information in the INVITE message. Following this INVITE, in step 604, if the User Interface answers the call, in step 606, the emergency dialog will be resumed.

In one embodiment, the SIP User Agent may start a timer when any User Interface action that would normally end a call occurs. Any suitable length of time may be used for this timer. In one embodiment, this timer may be a 45 minute timer. In one embodiment, the timer is restarted when an INVITE is received within the emergency dialog. In step 612, when the timer expires, in step 614, the SIP User Agent may send a BYE to terminate the emergency dialog.

Figure 7:
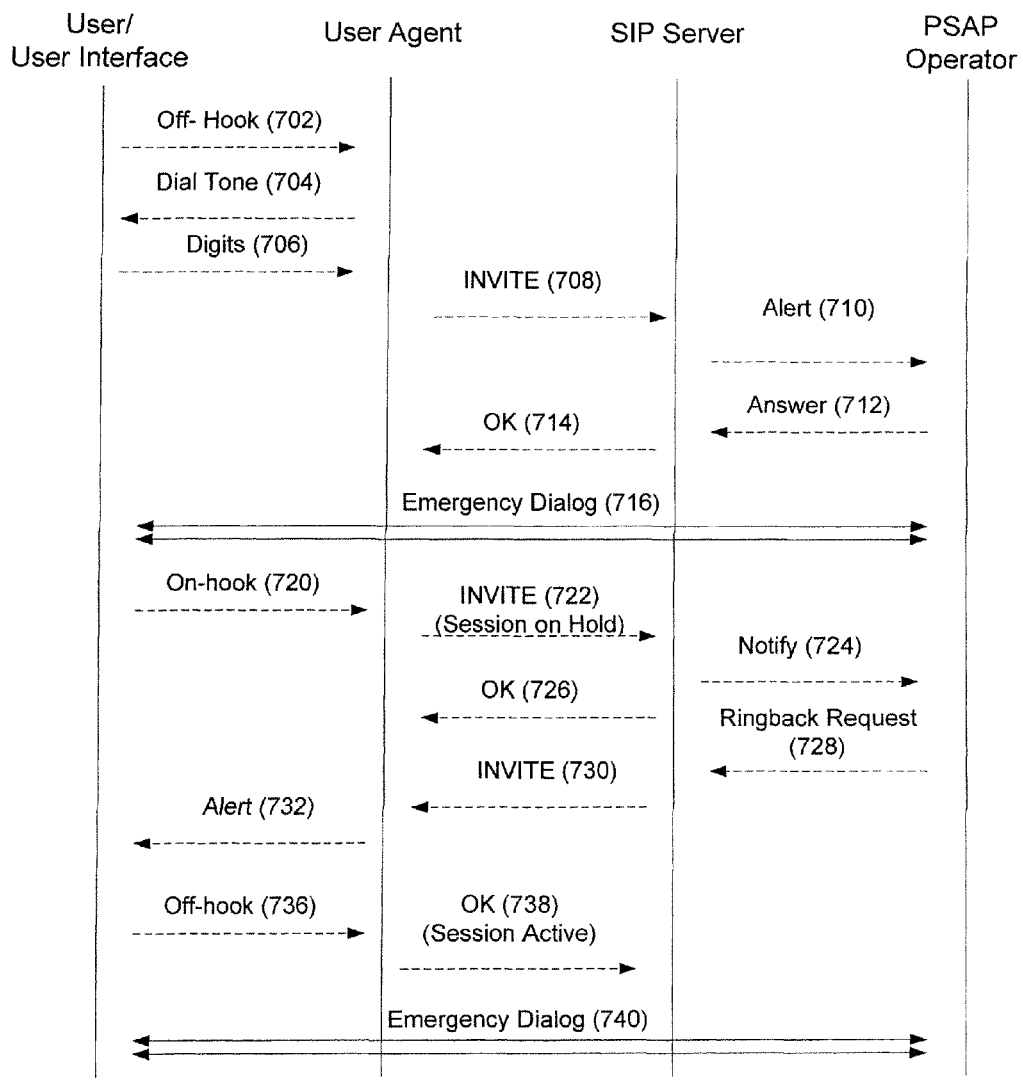
FIG. 7 illustrates an example call flow according to an embodiment of the present invention.

FIG. 7 illustrates an example call flow where the user attempts to terminate an emergency dialog by going on-hook. The call flow is as follows. First, the user goes off-hook (702) and the SIP User Agent generates a dial tone (704). The user then enters digits indicating an emergency call to its user interface (706) and these digits are received by the SIP User Agent. The SIP User Agent sends an INVITE to the SIP server (708) that may include a header field indicating an emergency call. The SIP server then alerts the PSAP operator (710). The PSAP operator answers the alert (712), which is sent to the SIP User Agent (714) and the emergency dialog is established (716).

The emergency dialog progresses until the user goes on-hook (720) by, for example, hanging up its user interface. The SIP User Agent recognizes this, and enables the forced hold behavior (722) and sends a message (e.g., an INVITE) to the SIP server indicating that the media session is on hold. The SIP server then notifies the PSAP operator of the forced hold (724). An OK is sent to the SIP User Agent (726).

In this example, once notified, the PSAP server then initiates a ringback (728) to the SIP server, and the SIP server sends an INVITE to the SIP User Agent (730). The SIP User Agent then alerts the user (732) by, for example, causing the user interface to ring. If the user goes off-hook (734), the SIP User Agent sends an OK to SIP server (736) indicating that the media session is active, and the SIP User Agent then resumes the emergency dialog (738).

Figure 8:
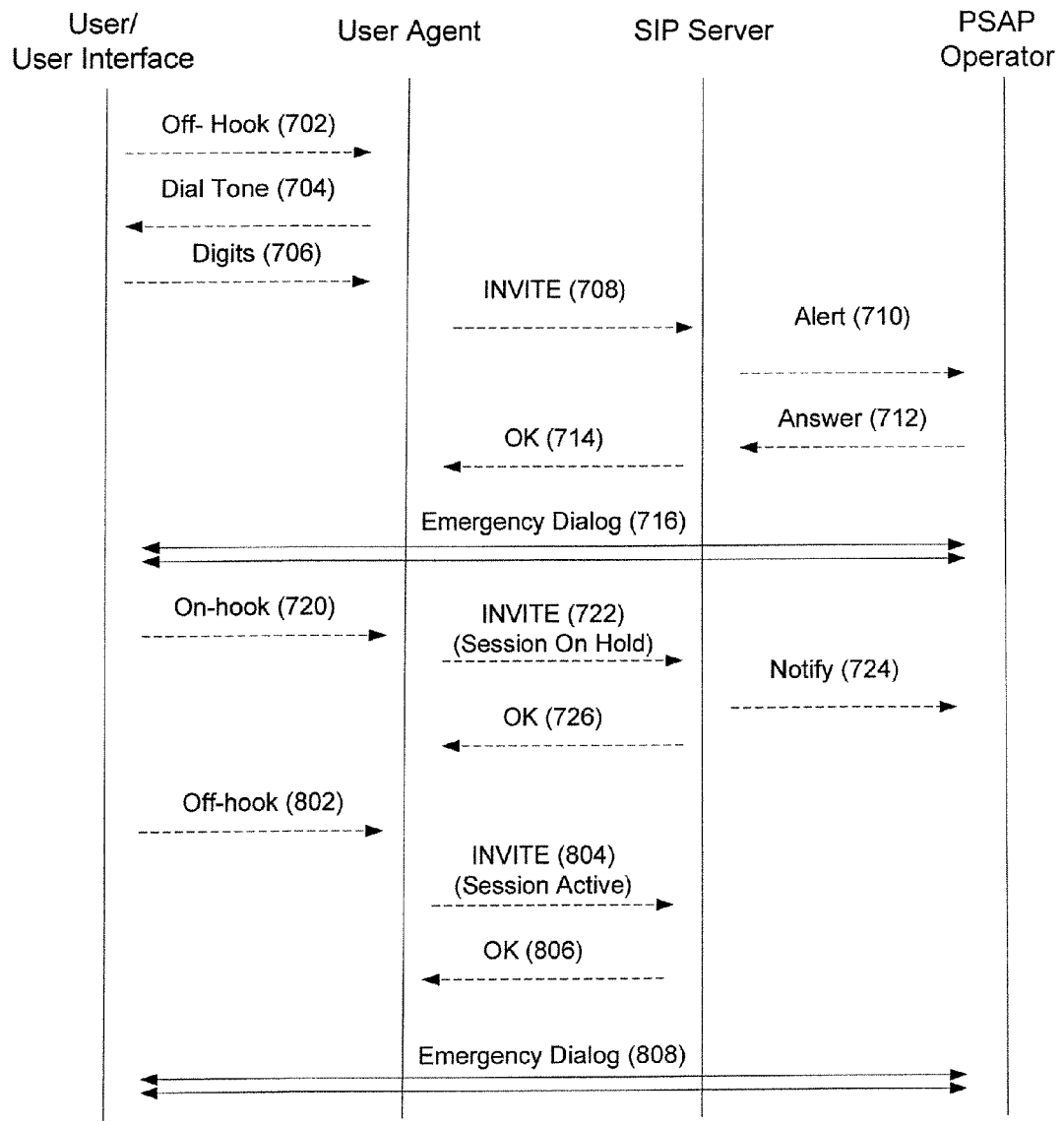
FIG. 8 illustrates an example call flow according to an embodiment of the present invention.

FIG. 8 depicts another example of a call flow in which user again attempts to terminate an emergency dialog by going on-hook. In this example, however, instead of the PSASP operator initiating a ringback after notification, the user goes off-hook (802). The SIP User Agent then sends an INVITE to the SIP server (804) with the forced hold behavior enabled, the SIP server sends an OK to the SIP User Agent (806), and the emergency dialog is resumed (808).

As noted above, an emergency call may be initiated using the procedure for initiating a three-way call, or call transfer. This is provided in GR-577 (three-way call), GR-579 (call transfer) and GR-529 (emergency call), the contents of all of which are expressly incorporated by reference in their entireties. In general, three-way calling and call transfer are similar except for the action undertaken when the user ends the call. In three-way calling, when the user ends the call the entire call is ended, while in a call transfer, when the user ends the call, the other parties remain connected, thereby completing the transfer.

According to the preferred embodiment, if the emergency call was initiated using the procedure for initiating a three-way call or a call transfer, and the user attempts to terminate the emergency dialog by, for example, going on-hook, the SIP User Agent enables the forced hold behavior.

Figure 9:
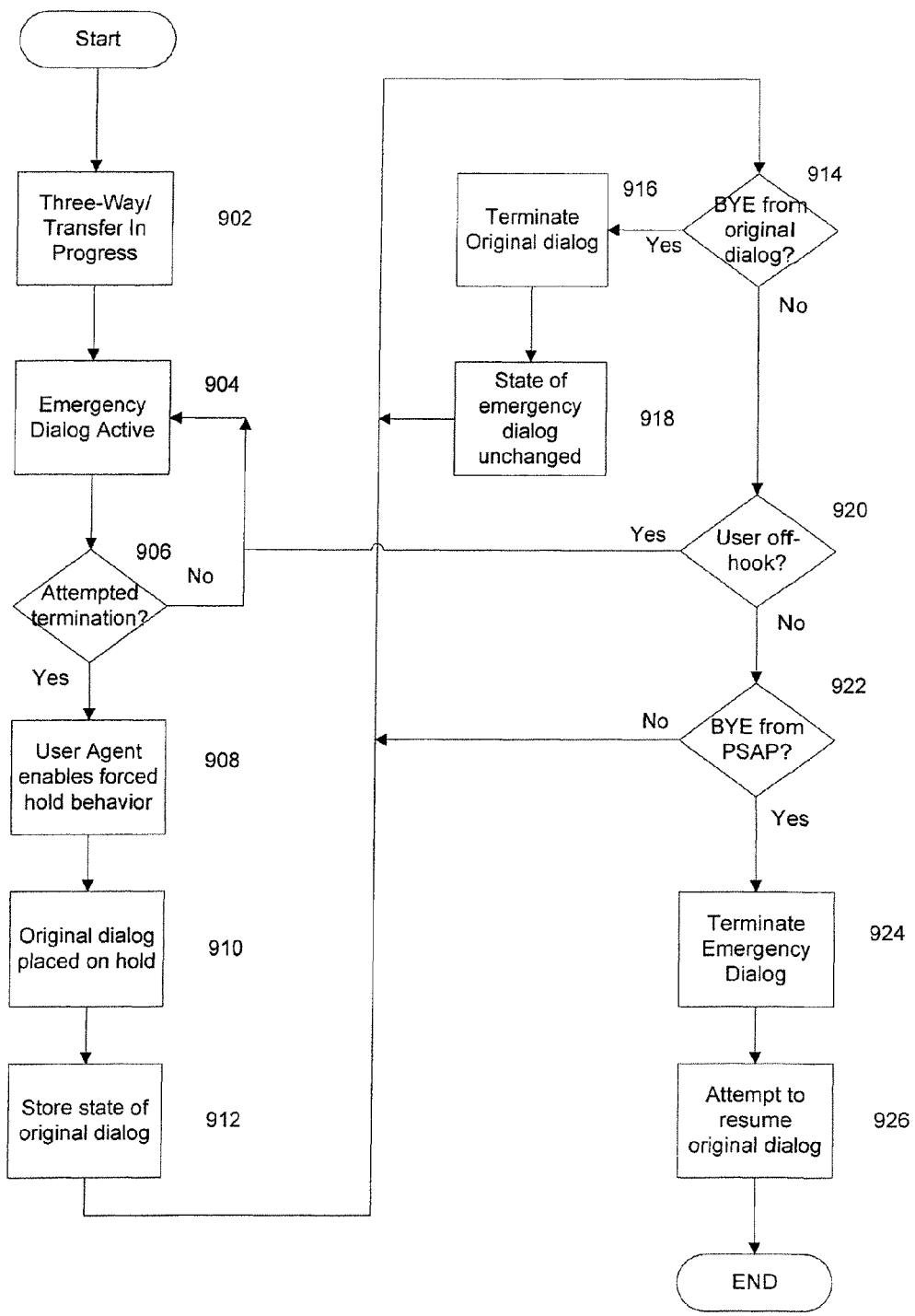
FIG. 9 is a flowchart depicting a method of providing a forced hold behavior according to an embodiment of the present invention.

Referring to FIG. 9, a flowchart depicting the forced hold behavior in the context of a three-way or call transfer is provided. In step 902, the three-way call or call transfer is in progress, and in step 904, an emergency dialog is active by the user, for example, entering digits corresponding to an emergency code.

In step 906, if the user attempts to terminate the emergency dialog, such as by going on-hook, in step 908 the User Agent enables the forced hold behavior.

In step 910, the media session for the original dialog (i.e., the three-way call or the call transfer dialog) is placed hold if it is not already on hold.

In step 912, the SIP User Agent stores the state of the three-way call or call transfer procedure at the point when the user interface action that would normally end a call (e.g., going on-hook) occurred.

In step 914, if the SIP User Agent receives a BYE in the original dialog, the original dialog is terminated, in step 916, the three-way or call transfer procedure is be terminated, and, in step 918, the state of the emergency dialog remains unchanged.

In step 920, if the emergency dialog media session is resumed in response to a user interface action, such as by going off-hook, the three-way call or call transfer procedure is resumed in the remembered state. This will result in the original dialog remaining on hold or the original dialog and emergency dialog being joined in a conference, depending on the remembered state of the original dialog.

In step 922, if the SIP User Agent receives a BYE or by timeout from the PSAP operator, as discussed above with regard to step 612, as an action that terminates the emergency dialog. and will terminate the emergency dialog in step 924. In step 926, the user interface will either terminate the original dialog or the SIP User Agent applying alerting in an attempt to resume the original dialog, depending on the remembered state of the original dialog.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
   receiving, by a device including a Session Initiation Protocol (SIP) user agent, a request for an emergency dialog from a user interface, wherein the user interface is coupled to the device;
   establishing an emergency dialog with a safety answering point;
   in response to a user interface action that would normally end the user interface, placing the emergency dialog in a forced hold state, wherein the forced hold state is enabled by the device including the SIP user agent; and
   receiving, by a SIP server, an invite message based at least in part on the user interface action, while the forced hold state is enabled 2. The method of claim 1, further comprising the step of:
   terminating the emergency dialog in response to the safety answering point terminating the emergency dialog.

3. The method of claim 1, wherein receiving a request for an emergency dialog from a user interface comprises:
  receiving at least one digit from the user interface indicating a request for an emergency dialog.

4. The method of claim 1, wherein establishing an emergency dialog with a safety answering point comprises:
  sending an invite to the SIP server requesting an emergency dialog.

5. The method of claim 4, wherein the invite comprises a priority header.

6. The method of claim 1, wherein establishing an emergency dialog with a safety answering point comprises:
  responding to an invite to the user interface from a third party with a 486 response.

7. The method of claim 1, further comprising:
  determining if the SIP server supports the emergency dialog hold;
  in response to a determination that the SIP server supports the emergency dialog hold, notifying a the safety answering point that the emergency dialog is on hold and putting the emergency dialog on hold; and
  in response to a determination that the SIP server does not support the emergency dialog hold, terminating the emergency dialog.

8. The method of claim 1, wherein putting the emergency dialog on hold comprises:
  reestablishing the emergency dialog in response to the user going off-hook.

9. The method of claim 1, wherein putting the emergency dialog on hold comprises:
  alerting the user interface in response to an invite;
  reestablishing the emergency dialog in response to the user going off-hook.

10. The method of claim 1, wherein putting the emergency dialog on hold comprises:
  starting a timer in response to the user interface going on-hook; and
  terminating the emergency dialog in response to the passage of a predetermined amount of time.

11. The method of claim 10, further comprising:
  stopping the timer in response to the user interface going off-hook.

12. A non-transitory computer readable media comprising code to perform the method of claim 1.

13. A method comprising:
  establishing an original dialog between a user interface and a called party, wherein the user interface is coupled to a device including a Session Initiation Protocol (SIP) user agent;
  receiving a request for an emergency dialog from the user interface;
  establishing an emergency dialog with a safety answering point;
  in response to a user interface action that would normally end the user interface, placing the emergency dialog in a forced hold state, wherein the forced hold state is enabled by the device;
  receiving, by a SIP server, an invite message based at least in part on the user interface action, while the forced hold state is enabled; and
  storing, by the device, the state of the original dialog in response to the user interface action.

14. The method of claim 13, wherein receiving a request for an emergency dialog from the user interface comprises:
  receiving the request for an emergency dialog as one of a three-way call and a call transfer.

15. The method of claim 13, further comprising:
  terminating the emergency dialog in response to the safety answering point terminating the emergency dialog.

16. The method of claim 13, wherein putting the emergency dialog on hold comprises:
  starting a timer in response to the user interface going on-hook; and
  terminating the emergency dialog in response to the passage of a predetermined amount of time.

17. The method of claim 16, further comprising:
  stopping the timer in response to the user interface going off-hook.

18. The method of claim 15, further comprising
  resuming the original dialog in accordance with the stored state of the original dialog.

19. The method of claim 13, further comprising:
  terminating the original dialog in response to a bye in the original dialog.

20. A system comprising:
  a device;
  a user interface coupled to the device;
  a Session Initiation Protocol (SIP) server; and
  a SIP user agent, included in the device, and in communication with the user interface and the SIP server, wherein the SIP user agent is configured to:
    enable, in response to a user interface action that would normally end the user interface, placing of the emergency dialog in a forced hold state; and
    transmit an invite message to the SIP server based at least in part on the user interface action, while the forced hold state is enabled.

* * * * *